United States Patent
Zinner et al.

(10) Patent No.: US 11,973,581 B2
(45) Date of Patent: Apr. 30, 2024

(54) METHOD FOR PROTECTING THE TIME SYNCHRONIZATION IN A NETWORK AGAINST UNAUTHORIZED CHANGES

(71) Applicant: Continental Automotive GmbH, Hannover (DE)

(72) Inventors: Helge Zinner, Regensburg (DE); Julian Brand, Regensburg (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/774,368

(22) PCT Filed: Nov. 4, 2020

(86) PCT No.: PCT/EP2020/080934
§ 371 (c)(1),
(2) Date: May 4, 2022

(87) PCT Pub. No.: WO2021/089607
PCT Pub. Date: May 14, 2021

(65) Prior Publication Data
US 2022/0376808 A1    Nov. 24, 2022

(30) Foreign Application Priority Data

Nov. 5, 2019    (DE) .................... 10 2019 217 035.8

(51) Int. Cl.
*H04J 3/06*    (2006.01)
(52) U.S. Cl.
CPC .......... *H04J 3/0679* (2013.01); *H04J 3/0641* (2013.01); *H04J 3/0667* (2013.01)
(58) Field of Classification Search
CPC ....... H04J 3/0679; H04J 3/0641; H04J 3/0667
See application file for complete search history.

(56) References Cited

U.S. PATENT DOCUMENTS

| 8,416,763 B1 | 4/2013 | Montini et al. |
| 9,450,846 B1 | 9/2016 | Huang et al. |

(Continued)

FOREIGN PATENT DOCUMENTS

| CN | 201702858 U | 1/2011 |
| CN | 201705770 U | 1/2011 |

(Continued)

OTHER PUBLICATIONS

"Global Time Synchronization in an Automotive Ethernet Network—Everything Done?", Vector, 2015.

(Continued)

*Primary Examiner* — Samina F Choudhry

(57) ABSTRACT

The time synchronization of a network is protected against unauthorized changes to the grandmaster clock of a base time domain by monitoring the physical communication interfaces of a network device for arrival of messages relating to time synchronization. If the messages relating to time synchronization apply to the initially set-up and synchronized base time domain, a check is performed to determine whether the messages relating to time synchronization announce a new grandmaster clock having better clock parameters than those of the present grandmaster clock. If so, a virtual base time domain is started by the network device. If the verification reveals that the proposed new grandmaster clock is trustworthy or valid, the network device discontinues the virtual time domain, updates its stored information concerning the grandmaster clock and, from this time onward, sends messages relating to time synchronization that are based on the new clock parameters to the network.

28 Claims, 2 Drawing Sheets

(56) References Cited

U.S. PATENT DOCUMENTS

| | | | |
|---|---|---|---|
| 2007/0147435 A1* | 6/2007 | Hamilton | H04L 43/0858 370/503 |
| 2013/0227008 A1 | 8/2013 | Yang | |
| 2014/0281037 A1 | 9/2014 | Spada et al. | |
| 2015/0127978 A1 | 5/2015 | Cui et al. | |
| 2015/0178109 A1* | 6/2015 | Li | G06F 9/45558 718/1 |
| 2015/0236940 A1 | 8/2015 | Zinner et al. | |
| 2015/0295669 A1 | 10/2015 | Chapman et al. | |
| 2016/0149692 A1 | 5/2016 | Kim et al. | |
| 2016/0320974 A1 | 11/2016 | Dong et al. | |
| 2016/0323312 A1 | 11/2016 | Voelker et al. | |
| 2018/0035203 A1 | 2/2018 | Hirai et al. | |
| 2018/0062780 A1 | 3/2018 | Shimizu et al. | |
| 2018/0145821 A1 | 5/2018 | Pietilainen | |
| 2019/0245690 A1 | 8/2019 | Shah et al. | |
| 2020/0295861 A1 | 9/2020 | Zinner | |
| 2021/0120386 A1 | 4/2021 | Zinner et al. | |
| 2021/0152266 A1 | 5/2021 | Sakaue | |
| 2021/0194922 A1 | 6/2021 | Zinner | |
| 2021/0314078 A1 | 10/2021 | Zinner | |

FOREIGN PATENT DOCUMENTS

| | | |
|---|---|---|
| DE | 102012216689 A1 | 5/2014 |
| DE | 102014204752 A1 | 10/2014 |
| DE | 102014200558 A1 | 7/2015 |
| DE | 102015209047 A1 | 6/2016 |
| DE | 102017219209 A1 | 5/2019 |
| DE | 102018205264 B3 | 10/2019 |
| DE | 102018213898 A1 | 2/2020 |
| EP | 3288197 A1 | 2/2018 |
| EP | 3827532 A1 | 6/2021 |
| EP | 3827562 A1 | 6/2021 |
| JP | 2016225677 A | 12/2016 |
| JP | 2018037885 A | 3/2018 |
| JP | 6523589 B1 | 6/2019 |
| TW | 201702858 A | 1/2017 |
| TW | 201705770 A | 2/2017 |
| TW | I693547 B | 5/2020 |

OTHER PUBLICATIONS

Jesse "Zeitsynchronisation in Automotive-Ethernet-Netzen", 2016.
Machine translation of Jesse "Zeitsynchronisation in Automotive-Ethernet-Netzen", 2016.
Ziehensack "Automotive Ethernet—ECU Communication Architecture for Autonomous Driving", 2015, https://d23rjziej2pu9i.cloudfront.net/wp-content/uploads/2015/06/22092907/ECU_Communication_Architecture_for_Autonomous_Driving.pdf.
Matheus "Summary and Interpretation of the Results from the AV B/TSN Workshop Munich Feb. 6, 2017".
Itkin et al. "A Security Analysis and Revised Security Extension for the Precision Time Protocol", IEEE, 2016.
Search dated Apr. 10, 2023 from corresponding Japanese patent application No. 2022-525950.
Notice of Reasons for Refusal dated May 16, 2023 from corresponding Japanese patent application No. 2022-525950.

* cited by examiner

METHOD FOR PROTECTING THE TIME SYNCHRONIZATION IN A NETWORK AGAINST UNAUTHORIZED CHANGES

BACKGROUND

The present invention relates to communication networks having network devices that are time-synchronized to one another, in particular in electrical systems of vehicles.

Ethernet technologies are used increasingly in vehicles and replace older or proprietary data connections and data buses therein. Ethernet connections support a multiplicity of network protocols on layer 3 of the OSI layer model for transmitting data packets between transmitters and receivers. On the higher protocol layers, the segmentation of the data stream into packets, the process communication between systems that communicate with one another, the translation of data into a system-independent form and finally the provision of functions for applications take place.

Systems in vehicles that are communicatively connected to one another by way of Ethernet connections can make particularly high demands on the reliability of the transmission and on the coordination of the timing of data packets. High demands are made on the coordination of the timing in particular for safety-critical applications in vehicles, for example the transmission of sensor and control information for autonomous driving or driver assistance systems.

The extent to which time-synchronized network devices are used will increase further in future, among other things because an ever greater number of control units transmit sensor data from different sensors, which are combined and evaluated in order to provide safety and convenience functions. This combination of sensor data from different sensors is also referred to as sensor fusion. A particularly important aspect when fusioning sensor data is the temporal association of the sensor data. Depending on the application, it may be necessary to fusion sensor data that are associated on the basis of millisecond or microsecond accuracy, while a greater interval of time between the detection times may sometimes be admissible for other applications. It is also conceivable for the detection times to have to be associated on the basis of an accuracy in the region of nanoseconds. Apart from the data required for the sensor fusion, however, data that have been captured during monitoring of the operation of the vehicle and are used only for maintenance purposes or for documenting approved and proper operation, for example, may also be subject to stringent requirements for capturing and storing them with correct timing.

Almost all Ethernet communication networks employed in vehicles use a time synchronization protocol that provides a global time base in the network. The time synchronization in Ethernet networks is arranged in the IEEE 802.1AS standard, for example, which is based on the Precision Time Protocol (PTP). PTP defines a master/slave clock hierarchy having a best clock within a network, which is also referred to as the grandmaster clock. The time base for the other network devices in this network is derived from this best clock, the grandmaster. The Best Master Clock Algorithm (BMCA) is used to find this best clock and to announce this information in the network. To maintain the correct synchronization, IEEE 802.1AS-capable systems cyclically send announcement messages containing information relating to the best clock in the network to their neighboring nodes. The recipient of such a message compares this information with the features of its own clock and with the messages that may already have been received on another physical interface that contain information about the clocks of other network devices. A time synchronization tree is constructed on the basis of these messages. In the course of this, each physical interface, subsequently also referred to as a port, is assigned one of four statuses. The "master port" status is given to the port that has a shorter route to the grandmaster than its connection partner. The "slave port" status is assigned when no other port on this network device has this status yet. The port that cannot fully support the PTP protocol chooses the "disabled" status. The "passive" status is chosen if none of the other three statuses apply.

In a variant of the PTP, the generalized Precision Time Protocol (gPTP), two network devices each always communicate with one another directly for the purpose of time synchronization, and neither of the two network devices just forwards a received message relating to time synchronization to a further network device in the network. Instead, prior to forwarding, received time information is corrected by the network device for delays on the receiving line and in the network device itself, before the corrected time information is forwarded. These network devices are also referred to as "time-aware systems".

FIG. 1 shows an exemplary block diagram of a vehicle network 100 with multiple network devices 102, 104, 106, 108, 110 and 112 time-synchronized to a first grandmaster clock. The network devices 102 and 108, 102 and 104, 104 and 110, 104 and 106 and 106 and 112 are in each case connected to one another by way of bidirectional communication connections in this case. Network devices 104, 106 and 108 are moreover connected to further network devices, not shown in the figure, by way of bidirectional communication connections. Each of the network devices 102-112 has a timer that can be synchronized in accordance with the IEEE 802.1AS standard. Following execution of the BMCA arranged in the standard, network device 112 has been found as the grandmaster clock for the entire system, i.e. messages relating to time synchronization are sent to the network from network device 112. In this case, network device 112 sends messages relating to time synchronization to the network device 106 that is directly connected to it, and to a further network device, which is not shown in the figure. The direction of sending of the messages relating to time synchronization is indicated in each case by the dashed arrows depicted beside the communication connections. Network device 106 corrects the time information received from network device 112 for the previously determined delay on the communication connection to network device 112 and the time required in the network device 106 for correction and forwarding, and sends on an accordingly modified message relating to time synchronization to network device 104 and to a further network device, which is not represented in the figure. The messages relating to time synchronization contain not only the corrected time information but also information about the grandmaster clock of the system, in this case network device 112. Network device 104 proceeds accordingly and again sends messages relating to time synchronization, corrected for relevant delays, to network devices 110 and 102, and also to a further network device, which is not shown in the figure. Accordingly again, network device 102 sends corrected time information to the network device 108. Owing to the respective correction of the time information prior to forwarding, all of the timers in the network devices are synchronized to the time of the grandmaster clock, except for any remaining residual inaccuracies on account of individual differences in the corrections of the time information prior to the respective forwarding. The grandmaster clock cyclically sends messages relating to time synchronization to the network, which are then distributed further as described above.

The IEEE 802.1AS standard permits the timing system, the grandmaster, to change at any time. For this purpose, the Best Master Clock Algorithm (BMCA) is performed again. If for example a control unit is operated with altered clock parameters or a new control unit is added to the network, the BMCA is performed and the clock that currently has the best clock parameters is always selected by the network devices of the system. The BMCA can also be triggered by a software or hardware error in a network device, or brought about by an attacker by way of appropriate manipulation of the software or hardware. Such a case is shown in FIG. 2.

In FIG. 2, network device 108 sends Announce messages to network device 102 that contain clock parameters of a better clock than that of network device 112. Network device 102 sends on said messages to the other network devices, which progressively synchronize their local clocks to the new grandmaster clock. Network device 112 is now no longer the grandmaster clock, but rather receives messages relating to time synchronization that are based on time information from the clock of network device 108. The changed time synchronization is indicated by the hatching of the rectangles representing the network devices and by the changed direction of some of the dashed arrows that indicate the propagation of the messages relating to time synchronization.

If an attacker succeeds in taking over the time synchronization in a vehicle network and incorrectly synchronizing individual or all network devices, this can have dangerous effects on the safety of vehicle operation. If for example data from multiple different sensors are combined in order to control vehicle systems, it is necessary for the sensor data to have been captured within a predetermined time window in order to form a valid sensor database for control or feedback control intervention at a specific time. Data having widely different timing that have not been captured within a narrow time window necessary for sensor fusion but that, owing to time synchronization manipulated by an attacker, have been provided with a timestamp that is within the time window can lead to disruptions in operation through to system failure and, in the worst case, an accident.

A few approaches for recognizing changes in the configuration or structure of a communication network by using the time synchronization of the network are known from the prior art. An unauthorized change to the configuration of the network can comprise for example the interposition of a network device that intercepts messages and sends on altered messages. This can be used to prevent or at least disrupt safe and proper operation. DE102012216689B4 proposes identifying attacks of this kind by monitoring delays for messages relating to time synchronization within the communication network. An additional network device that is later connected between two network devices and intercepts and forwards messages, or a manipulation of the software of a network device in a way that relates to data forwarding, will inevitably alter the delay for the messages, even if the forwarded message is not altered, which means that the attack can be identified.

A correct and safe time base in networks is also of great importance in another context. As such, for example DE102014200558A1 describes secure network access protection that involves the use of authenticated timing protected by means of authentication protocols. In this case, a delay for messages is determined and the integrity of the messages relating to time synchronization is validated by way of an additional protocol.

Whilst the use of time synchronization mechanisms and protocols in networks is widely used for secondary purposes, protection of the time synchronization itself against attacks has not been considered, or has been considered only little, to date.

It is thus an object of the invention to specify a method and a network device that at least impede unauthorized changing of the time synchronization in a network.

BRIEF SUMMARY

This object is achieved by the method and the network device specified in the independent claims. Refinements and further developments of the method and system are specified in the respective dependent claims.

The invention's protection of the time synchronization is directed primarily at preventing or at least impeding undesirable or unauthorized changing of the grandmaster clock of a base time domain of the network by an attacker or a hardware or software malfunction after an initial synchronization. Here, a base time domain denotes the fundamental time domain that applies to all network devices in the network.

In this description, a communication connection denotes a physical or logical connection between a transmitter and a receiver. Communication connections can be uniquely identified by port numbers. Port numbers can be used to distinguish between multiple different communication connections that start from an end point or end at an end point.

The terms network device and network node are used synonymously in this description, unless the respective context suggests a distinction.

In the description that follows, it is assumed that a correct and unmanipulated initialization of the base time domain has taken place, for example in accordance with the Best Master Clock Algorithm (BMCA) of the IEEE 802.1AS standard, and that all network devices in the network have information about which network device provides the grandmaster clock of the base time domain for the network, and what clock ID and what clock parameters the grandmaster clock has. Each network device can also have information about which of its physical interfaces are used for delivering the valid messages relating to time synchronization. This initial situation corresponds to the situation described earlier on with reference to FIG. 1.

A method for protecting the time synchronization in a network against unauthorized changes according to the invention comprises monitoring all the physical communication interfaces of a first network device for the arrival of Announce, Sync or FollowUp messages from a second network device, which messages are used to disseminate information relating to the best clock in the network. Normally, such messages are sent and possibly forwarded cyclically in networked systems based on the IEEE 802.1AS standard.

The time information is extracted from the received Announce, Sync and FollowUp messages, among other things Grandmaster Clock Class, Grandmaster Clock Accuracy, Grandmaster Priority1, Grandmaster Priority2 and Current UTC Offset. Additionally, the messages are checked by the first network device for whether they apply to the base time domain. If this is not the case and the Announce, Sync or FollowUp message applies to a separate time domain to which the first network device does not belong, for example, the message can be forwarded in accordance with the standard. Otherwise, for example if the message applies to a virtual base time domain that the first network device has already started previously for messages relating to time synchronization that come from the second network device, the message can be forwarded to a process step described later on in order to verify the clock parameters transmitted in said message, or it can be rejected.

If the Announce message applies to the base time domain, a check is performed to determine whether the Announce message announces a new grandmaster clock having better clock parameters than those of the present grandmaster clock. If this is not the case, the Announce message can be ignored, or a message relating to time synchronization containing the information relating to the grandmaster clock of the network can be sent from the first network device to the second network device.

If the clock parameters received in the Announce message describe a clock having better parameters, the invention involves the second network device being isolated from the rest of the network with regard to messages relating to time synchronization that are sent by said network device. The isolation is used to ensure that the potential new grandmaster clock provided by the second network device is not immediately adopted in the system or activated, or the messages of said network device that relate to time synchronization are not even forwarded, because it is not yet certain whether the second network device is safe and trustworthy as a new timer and, in an undesirable case, the entire system would change over to a sometimes unreliable or incorrect clock within a few milliseconds. To this end, the first network device starts a virtual base time domain for the messages relating to time synchronization that arrive from the second network device. On the basis of the messages relating to time synchronization that arrive from the second network device, the first network device sends no messages of its own relating to time synchronization to further network devices that are directly connected to it, but rather sends only requests and responses that are necessary in accordance with the IEEE 802.1AS standard to the second network device. The time synchronization that has applied to date is continued unchanged by the first network device and all other network devices except for the second network device. The virtual base time domain applies only to the second network device and to an area that is isolated from the rest of the first network device.

The first network device additionally performs verification of the clock parameters sent by the second network device. This can comprise for example a comparison with clock parameters reported by the second network device during the initialization of the time synchronization that are stored in the first network device, a check for admissible or inadmissible combinations of clock class and clock accuracy, or else a comparison of the time information contained in messages relating to time synchronization that are sent by the second network device with the time information sent by the original grandmaster clock over a longer period, or a check for whether different clock parameters have repeatedly been transmitted in messages relating to time synchronization that were received in succession via the relevant interface. In the course of the verification, the new grandmaster clock can also be authorized on a higher protocol level, for example by a control unit having adequate rights that is temporarily connected to the system. The authorization can also be requested by the first network device by way of an appropriate message to a network device equipped with higher rights. If the verification reveals that the grandmaster clock proposed by the second network device is trustworthy or valid, the first network device discontinues the virtual base time domain, updates its information stored for the grandmaster clock and sends messages relating to time synchronization that are based on the new clock parameters to the network. Otherwise, the first network device declines the clock as the new grandmaster clock.

The declination can involve for example the first network device itself sending a message relating to time synchronization to the second network device professing that it has a better clock than that proposed by the second network device. The second network device would then immediately have to stop sending its own Sync, Announce or FollowUp messages. If this is the case, the virtual time domain is discontinued and the method proceeds with the monitoring of the arriving messages relating to time synchronization. If the second network device does not stop sending its own Sync, Announce or FollowUp messages despite "responses" from the first network device with a "better" clock, the virtual time domain is maintained in order to isolate the messages relating to time synchronization that are coming from the second network device from the rest of the network until the second network device stops sending the Sync, Announce or FollowUp messages, or the validity of the clock reported by the second network device is acknowledged on a higher protocol level.

Before the first network device starts a virtual base time domain, it can send the second network device a message containing the proposal to set up a separate time domain in which the second network device acts as grandmaster clock. If the second network device accepts this proposal, the first network device runs the separate time domain. The first network device does not necessarily need to forward messages relating to time synchronization for the separate time domain to the network in this case; it can simply terminate or ignore the messages without even notifying the second network device of this. In certain cases, however, it can forward these messages, for example to a network device that is intended to check the messages relating to time synchronization that apply to the separate time domain. In this case, the messages are provided with a separate domain number, for example. If the second network device does not accept the proposal, it starts the virtual base time domain as described above and performs the further method steps.

Even if the first network device has started a virtual base time domain, it can forward non-time-related communication coming from the second network device to the respective recipients via the network in the usual way. The first network device can reject time-critical messages, for example messages having timestamps that are discernibly intended for safety-relevant applications, or it can send a message to the network indicating to the other network devices that the messages coming from the second network device are not trustworthy, at least in regard to the related time information. It is also possible for the first network device to provide the messages with its own timestamp, and to identify the message in the appropriate way. To this end, there may be provision for a flag or other field in the message or in a header.

A computer program product according to the invention contains instructions that, when executed by a computer, cause said computer to perform one or more refinements and further developments of the method described above.

The computer program product may be stored on a computer-readable data carrier. The data carrier may be in a physical embodiment, for example as a hard disk, CD, DVD, flash memory or the like; however, the data carrier may also comprise a modulated electrical, electromagnetic or optical signal that can be received by a computer by means of an appropriate receiver and can be stored in the memory of the computer.

A network device implementing the method according to the invention comprises not only a microprocessor and nonvolatile and volatile memory but also at least two physical communication interfaces. The elements of the network device are communicatively connected to one another by means of one or more data lines or data buses. The network device is configured to receive messages relating to time synchronization on the interfaces and to carry out the check on and, if necessary, isolation of the Announce, Sync or FollowUp messages using the method described above.

A system according to the invention having multiple network devices connected by way of a communication network comprises at least one network device that is configured to perform the method according to the invention described above.

The method according to the invention can advantageously be used to improve the reliability of the time synchronization in particular of communication connections in safety-relevant networks, as are needed for example when transmitting sensor data for autonomous driving or driver assistance systems.

The method according to the invention can be implemented using existing network devices, in which case only adaptations in the software may be needed in order to allow the setup and operation of separate time domains. As a result, only low additional costs are incurred for the implementation, if at all. Even existing systems can be configured to implement the method, by way of appropriately changed software. A further advantage of the method according to the invention is that the respective underlying hardware platform is irrelevant so long as these support the setup or operation of multiple separate time domains and the PTP.

BRIEF DESCRIPTION OF THE DRAWINGS

The invention will be explained below by way of example with reference to the drawing.

Identical or similar elements may be referenced by the same reference signs in the figures.

DETAILED DESCRIPTION

Figure 1:
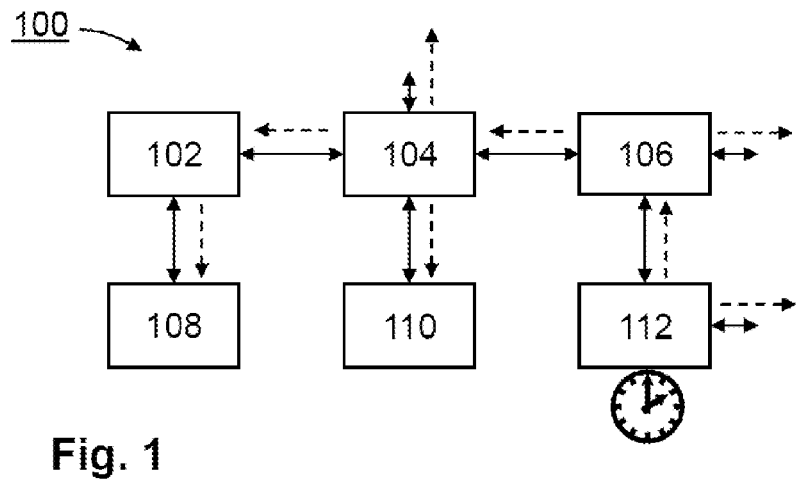
FIG. 1 shows an exemplary block diagram of a vehicle network with multiple network devices time-synchronized to a first grandmaster clock.
Figure 2:
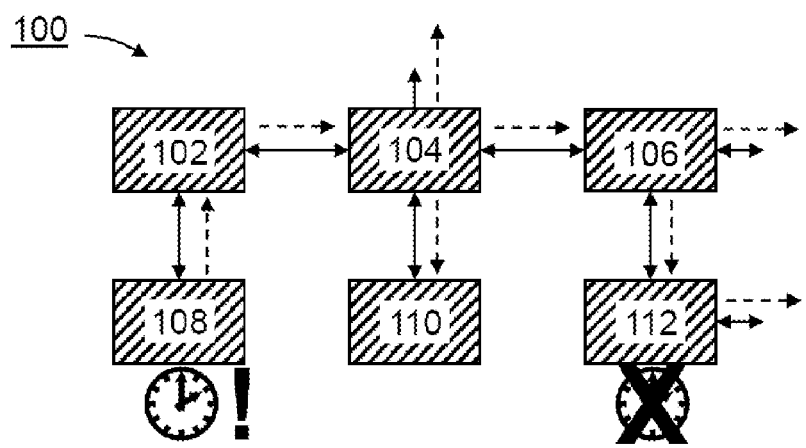
FIG. 2 shows an exemplary block diagram of the vehicle network with multiple time-synchronized network devices from FIG. 1, wherein the first grandmaster clock has been superseded by a second grandmaster clock.

FIGS. 1 and 2 were already explained earlier on and are therefore not described again at this juncture.

Figure 3:
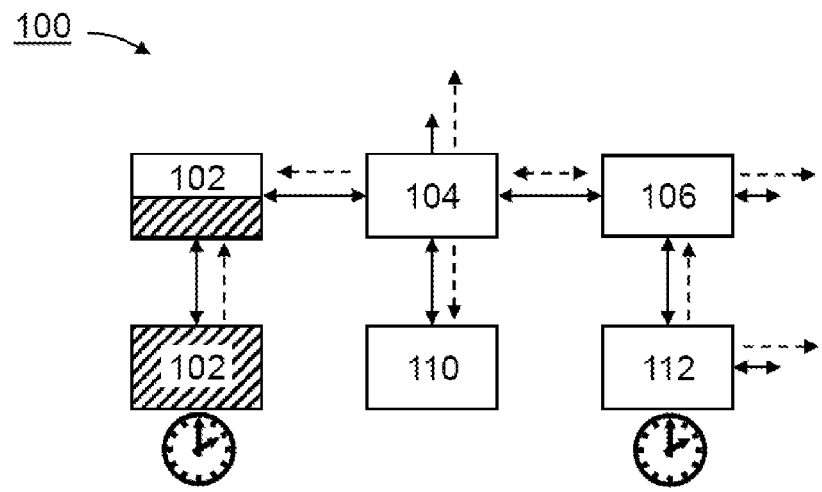
FIG. 3 shows an exemplary block diagram of a vehicle network with multiple time-synchronized network devices when an aspect of the method according to the invention is performed.

FIG. 3 shows an exemplary block diagram of a vehicle network 100 with multiple time-synchronized network devices when an aspect of the method according to the invention is performed. As described previously with reference to FIG. 2, network device 108 has sent an Announce message to network device 102 announcing a clock having better clock parameters. On the basis of the method stipulated in the IEEE 802.1AS standard, this clock would become the grandmaster clock for the entire network. In order to impede or prevent simple manipulation, the network device 102 starts a virtual time domain in which the clock proposed by the network device 108 acts as the grandmaster clock. For the other network devices, the clock provided by network device 112 is the grandmaster clock, as previously. The division of the time domains into the present time domain and the virtual time domain that is brought about by network device 102 is indicated by the partial hatching of network device 102. The dashed arrows indicate the direction of sending of the messages relating to time synchronization from the grandmaster clock of the network or the virtual time domain.

Figure 4:
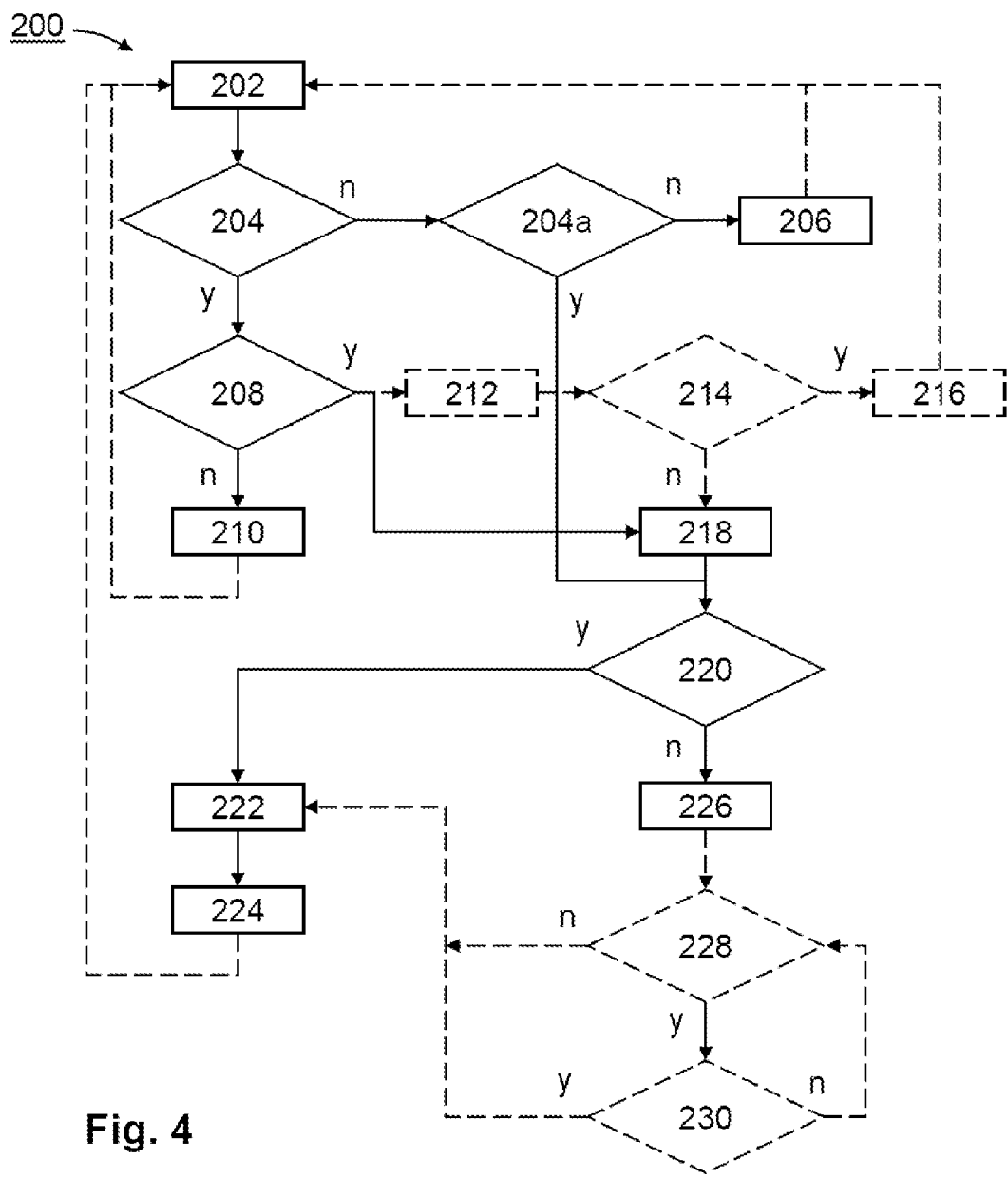
FIG. 4 shows a schematic flowchart for an embodiment of the method according to the invention.

FIG. 4 shows a schematic flowchart for an embodiment of the method 200 according to the invention in a first network device. In step 202, the interfaces are first monitored for Announce, Sync or FollowUp messages from a second network device connected thereto. When such a message relating to time synchronization arrives, it is first checked for whether it applies to the initially set-up and synchronized base time domain. If this is not the case, "no" branch of step 204, a check is performed in step 204a to determine whether the message relating to time synchronization applies to a previously started virtual base time domain. If this is not the case, "no" branch of step 204a, the messages relating to time synchronization are forwarded in step 206. If the check in step 204 reveals that the messages relating to time synchronization apply to the base time domain, "yes" branch of step 204, a check is next performed in step 208 to determine whether the messages relating to time synchronization announce a new grandmaster clock having better clock parameters than those of the present grandmaster clock. If this is not the case, "no" branch of step 208, the message is rejected or ignored in step 210 and the monitoring is continued. If the check in step 208 reveals that a new grandmaster clock having better clock parameters than those of the present grandmaster clock is announced, "yes" branch of step 208, a virtual base time domain is started by the first network device in step 218. Before starting the virtual base time domain in step 218, the first network device can optionally propose setting up a separate time domain to the second network device in step 212. If the second network device accepts this proposal, "yes" branch of step 214, the first network device can run the separate time domain and forward the messages relating to time synchronization that apply to the separate time domain to the remainder of the network as appropriate. If the second network device does not accept the proposal to set up a separate time domain, "no" branch of step 214, the first network device starts the virtual base time domain. In the virtual base time domain, the clock parameters sent by the second network device are then verified in step 220. If the check in step 204a already reveals that the messages relating to time synchronization received from the second network device apply to a previously set-up virtual base time domain, "yes" branch of step 204a, the method immediately proceeds with the verification of the clock parameters in step 220, bypassing the checks in step 208 and possibly step 214. If the verification in step 220 reveals that the grandmaster clock proposed by the second network device is trustworthy or valid, "yes" branch of step 220, the first network device discontinues the virtual time domain in step 222, updates its stored information concerning the grandmaster clock in step 224 and, from this time onward, sends messages relating to time synchronization that are based on the new clock parameters to the network. If the verification in step 220 reveals that the grandmaster clock proposed by the second network device is not trustworthy or is invalid, "no" branch of step 220, the first network device declines the clock proposed by the second network device as the grandmaster clock for the base time domain in step 226. The declination can comprise the first network device sending its own Announce message to the second network device, with clock parameters that represent a better clock than those transmitted in the message relating to time synchronization from the second network device. The virtual base time domain is maintained for as long as Announce, Sync or FollowUp messages arrive from the second network device and no authorization takes place on a higher protocol level. The applicable checks take place in steps 228 and 230.

Figure 5:
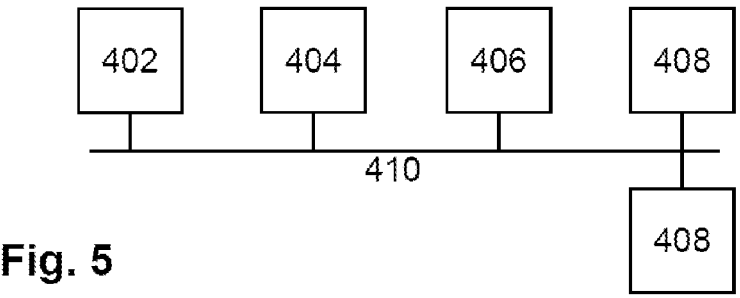
FIG. 5 shows an exemplary block diagram of a network device configured to perform the method according to the invention.

FIG. 5 shows an exemplary block diagram of a network device 400 configured to perform the method according to the invention. The network device 400 comprises not only a microprocessor 402 but also volatile and nonvolatile memory 404, 406 and two communication interfaces 408. The elements of the network device are communicatively connected to one another by way of one or more data connections or data buses 410. The nonvolatile memory 406 contains program instructions that, when executed by the microprocessor 402, implement at least one refinement of the method according to the invention.

LIST OF REFERENCE SIGNS

100 Network
102-112 Network devices
200 Method
202 Monitor messages relating to time synchronization
204 Base time domain check
204a Virtual base time domain check
206 Forward in virtual base time domain
208 Clock parameter check
210 Reject/ignore
212 Propose separate time domain
214 Check for whether separate time domain accepted
216 Forward
218 Start the virtual base time domain
220 Clock parameter verification
222 Discontinue virtual time domain
224 Update stored clock parameters
226 Decline new clock
228 Maintain virtual time domain
230 Check for authorization of the new clock
400 Network device
402 Microprocessor
404 RAM
406 ROM
408 Communication interface
410 BusAbstract

The invention claimed is:

1. A method for protecting time synchronization in a network against unauthorized changes to a grandmaster clock of a base time domain, comprising:
monitoring physical communication interfaces of a first network device for arrival of messages relating to time synchronization from a second network device, which messages are used to disseminate information relating to a best clock in the network,
performing first checking to determine whether the messages relating to time synchronization apply to an initially set-up and synchronized base time domain and, if this is the case:
performing second checking to determine whether the messages relating to time synchronization announce a new grandmaster clock having better clock parameters than those of a present grandmaster clock, and, if this is the case:
the first network device starting a virtual base time domain, wherein the first network device forwards no messages relating to time synchronization that are based on the messages relating to time synchronization of the second network device to the remainder of the network, and wherein requests and responses are sent from the first network device to the second network device in relation to the virtual base time domain,
verifying the clock parameters sent by the second network device, wherein, if the verification reveals that the grandmaster clock proposed by the second network device is trustworthy or valid, the first network device discontinues the virtual time domain, updates its stored information concerning the grandmaster clock and, from this time onward, sends messages relating to time synchronization that are based on the new clock parameters to the network, or otherwise declines the clock as the new grandmaster clock for the base time domain.

2. The method as claimed in claim 1, additionally comprising, before the virtual base time domain is started:
sending a response to the second network device proposing setup of a separate time domain, and
performing third checking to determine whether the second network device accepts an additional time domain and, if this is the case:
the first network device ignoring, terminating or forwarding the messages relating to time synchronization that arrive from the second network device for the additional time domain,
or, if this is not the case:
the first network device starting the virtual base time domain, and the subsequent method steps being performed.

3. The method as claimed in claim 1, wherein the verifying comprises:
comparing received clock parameters with clock parameters reported by the second network device during an initialization of the time synchronization that are stored in the first network device,
a check for admissible or inadmissible combinations of clock class and clock accuracy,
comparing the time information contained in messages relating to time synchronization that are sent by the second network device with the time information sent by the original grandmaster clock over a longer period, or
receiving an authorization on a higher protocol level.

4. The method as claimed in claim 1, wherein the declining comprises:
sending an Announce message to the second network device with clock parameters that represent a better clock than those transmitted in the Announce message of the second network device,
maintaining the virtual base time domain for as long as further Announce messages arrive from the second network device and no authorization of the new grandmaster clock announced by the second network device takes place on a higher protocol level.

5. The method as claimed in claim 1, additionally comprising, if the first checking reveals that the messages relating to time synchronization received from the second network device do not apply to the base time domain:
  checking whether the messages relating to time synchronization apply to a previously started virtual base time domain and, if so:
  verifying the clock parameters sent by the second network device, and performing the subsequent method steps, or, if not:
  forwarding or ignoring the messages relating to time synchronization.

6. The method as claimed in claim 1, additionally comprising, if the second checking reveals that the received Announce message does not announce a new grandmaster clock having better clock parameters than those of the present grandmaster clock:
  ignoring the Announce message.

7. The method as claimed in claim 1, wherein messages that arrive on the first network device from the second network device and are not used for clock synchronization but are provided with time information are forwarded by the first network device only after the first network device has added information to the message about the unclear trustworthiness of the time information, or after the first network device has informed all other network devices in the network about the unclear trustworthiness of the time information in messages coming from the second network device.

8. A network device comprising a microprocessor, volatile and nonvolatile memory, two or more communication interfaces communicatively connected to one another by way of one or more data lines or data buses, wherein the network device is configured to perform operations, for protecting time synchronization in a network against unauthorized changes to a grandmaster clock of a base time domain, comprising:
  monitoring physical communication interfaces of a first network device for arrival of messages relating to time synchronization from a second network device, which messages are used to disseminate information relating to a best clock in the network,
  performing first checking to determine whether the messages relating to time synchronization apply to an initially set-up and synchronized base time domain and, if this is the case:
  performing second checking to determine whether the messages relating to time synchronization announce a new grandmaster clock having better clock parameters than those of a present grandmaster clock, and, if this is the case:
  the first network device starting a virtual base time domain, wherein the first network device forwards no messages relating to time synchronization that are based on the messages relating to time synchronization of the second network device to the remainder of the network, and wherein requests and responses are sent from the first network device to the second network device in relation to the virtual base time domain,
  verifying the clock parameters sent by the second network device,
  wherein, if the verification reveals that the grandmaster clock proposed by the second network device is trustworthy or valid, the first network device discontinues the virtual time domain, updates its stored information concerning the grandmaster clock and, from this time onward, sends messages relating to time synchronization that are based on the new clock parameters to the network, or otherwise declines the clock as the new grandmaster clock for the base time domain.

9. A vehicle having a system having multiple net work devices, wherein at least one of the network devices includes a macroprocessor, volatile and nonvolatile memory, two or more communication interfaces communicatively connected to one another by way of one or more data lines or data buses, and wherein the network device is configured to perform operations, for protecting time synchronization in a network against unauthorized changes to a grandmaster cock of a base time domain, comprising;
  monitoring physical communication interfaces of a first network device for arrival of messages relating to time synchronization from a second network device, which messages are used to disseminate information relating to a best clock in the network,
  performing first checking to determine whether the messages relating to time synchronization apply to an initially set-up and synchronized base time domain and, if this is the case:
  performing second checking to determine whether the messages relating to time synchronization announce a new grandmaster clock having better clock parameters than those of a present grandmaster clock, and, if this is the case:
  the first network device starting a virtual base time domain, wherein the first network device forwards no messages relating to time synchronization that are based on the messages relating to time synchronization of the second network device to the remainder of the network, and wherein requests and responses are sent from the first network device to the second network device in relation to the virtual base time domain,
  verifying the clock parameters sent by the second network device,
  wherein, if the verification reveals that the grandmaster clock proposed by the second network device is trustworthy or valid, the first network device discontinues the virtual time domain, updates its stored information concerning the grandmaster clock and, from this time onward, sends messages relating to time synchronization that are based on the new clock parameters to the network, or otherwise declines the clock as the new grandmaster clock for the base time domain.

10. A non-transitory computer-readable medium having stored thereon computer executable instructions that, when executed by a computer, cause said computer to perform operations, for protecting time synchronization in a network against unauthorized changes to a grandmaster clock of a base time domain, comprising:
  monitoring physical communication interfaces of a first network device for arrival of messages relating to time synchronization from a second network device, which messages are used to disseminate information relating to a best clock the network,
  performing first checking to determine whether the messages relating to time synchronization apply to an initially set-up and synchronized base time domain and, if this is the case:
  performing second checking to determine whether the messages relating to time synchronization announce a new grandmaster clock having better clock parameters than those of a present grandmaster clock, and, if this is the case:
  the first network device starting a virtual base time domain, wherein the first network device forwards no messages relating to time synchronization that are based on the messages relating to time synchronization of the second network device to the remainder of the network, and wherein requests and responses are sent from the first network device to the second network device in relation to the virtual base time domain, verifying the clock parameters sent by the second network device, wherein, if the verification reveals that the grandmaster clock proposed by the second network device is trustworthy or valid, the first network device discontinues the virtual time domain, updates its stored information concerning the grandmaster clock and, from this time onward, sends messages relating to time synchronization that are based on the new clock parameters to the network, or otherwise declines the clock as the new grandmaster clock for the base time domain.

11. The network device as claimed in claim 8, additionally comprising, before the virtual base time domain is started:

sending a response to the second network device proposing setup of a separate time domain, and performing third checking to determine whether the second network device accepts an additional time domain and, if this is the case:

the first network device ignoring, terminating or forwarding the messages relating to time synchronization that arrive from the second network device for the additional time domain, or, if this is not the case:

the first network device starting the virtual base time domain, and the subsequent method steps being performed.

12. The network device as claimed in claim 8, wherein the verifying comprises:

comparing received clock parameters with clock parameters reported by the second network device during an initialization of the time synchronization that are stored in the first network device, a check for admissible or inadmissible combinations of clock class and clock accuracy, comparing the time information contained in messages relating to time synchronization that are sent by the second network device with the time information sent by the original grandmaster clock over a longer period, or receiving an authorization on a higher protocol level.

13. The network device as claimed in claim 8, wherein the declining comprises:

sending an Announce message to the second network device with clock parameters that represent a better clock than those transmitted in the Announce message of the second network device, maintaining the virtual base time domain for as long as further Announce messages arrive from the second network device and no authorization of the new grandmaster clock announced by the second network device takes place on a higher protocol level.

14. The network device as claimed in claim 8, additionally comprising, if the first checking reveals that the messages relating to time synchronization received from the second network device do not apply to the base time domain:

checking whether the messages relating to time synchronization apply to a previously started virtual base time domain and, if so:

verifying the clock parameters sent by the second network device, and performing the subsequent method steps, or, if not:

forwarding or ignoring the messages relating to time synchronization.

15. The network device as claimed in claim 8, additionally comprising, if the second checking reveals that the received Announce message does not announce a new grandmaster clock having better clock parameters than those of the present grandmaster clock:

ignoring the Announce message.

16. The network device as claimed in claim 8, wherein messages that arrive on the first network device from the second network device and are not used for clock synchronization but are provided with time information are forwarded by the first network device only after the first network device has added information to the message about the unclear trustworthiness of the time information, or after the first network device has informed all other network devices in the network about the unclear trustworthiness of the time information in messages coming from the second network device.

17. The vehicle as claimed in claim 9, additionally comprising, before the virtual base time domain is started:

sending a response to the second network device proposing setup of a separate time domain, and performing third checking to determine whether the second network device accepts an additional time domain and, if this is the case:

the first network device ignoring, terminating or forwarding the messages relating to time synchronization that arrive from the second network device for the additional time domain, or, if this is not the case:

the first network device starting the virtual base time domain, and the subsequent method steps being performed.

18. The vehicle as claimed in claim 9, wherein the verifying comprises:

comparing received clock parameters with clock parameters reported by the second network device during an initialization of the time synchronization that are stored in the first network device, a check for admissible or inadmissible combinations of clock class and clock accuracy, comparing the time information contained in messages relating to time synchronization that are sent by the second network device with the time information sent by the original grandmaster clock over a longer period, or receiving an authorization on a higher protocol level.

19. The vehicle as claimed in claim 9, wherein the declining comprises:

sending an Announce message to the second network device with clock parameters that represent a better clock than those transmitted in the Announce message of the second network device, maintaining the virtual base time domain for as long as further Announce messages arrive from the second network device and no authorization of the new grandmaster clock announced by the second network device takes place on a higher protocol level.

20. The vehicle as claimed in claim 9, additionally comprising, if the first checking reveals that the messages relating to time synchronization received from the second network device do not apply to the base time domain:

checking whether the messages relating to time synchronization apply to a previously started virtual base time domain and, if so:

verifying the clock parameters sent by the second network device, and performing the subsequent method steps, or, if not:

forwarding or ignoring the messages relating to time synchronization.

21. The vehicle as claimed in claim 9, additionally comprising, if the second checking reveals that the received Announce message does not announce a new grandmaster clock having better clock parameters than those of the present grandmaster clock:

ignoring the Announce message.

22. The vehicle as claimed in claim 9, wherein messages that arrive on the first network device from the second network device and are not used for clock synchronization but are provided with time information are forwarded by the first network device only after the first network device has added information to the message about the unclear trustworthiness of the time information, or after the first network device has informed all other network devices in the network about the unclear trustworthiness of the time information in messages coming from the second network device.

23. The non-transitory computer-readable medium as claimed in claim 10, additionally comprising, before the virtual base time domain is started:

sending a response to the second network device proposing setup of a separate time domain, and performing third checking to determine whether the second network device accepts an additional time domain and, if this is the case:

the first network device ignoring, terminating or forwarding the messages relating to time synchronization that arrive from the second network device for the additional time domain, or, if this is not the case:

the first network device starting the virtual base time domain, and the subsequent method steps being performed.

24. The non-transitory computer-readable medium as claimed in claim 10, wherein the verifying comprises:

comparing received clock parameters with clock parameters reported by the second network device during an initialization of the time synchronization that are stored in the first network device, a check for admissible or inadmissible combinations of clock class and clock accuracy, comparing the time information contained in messages relating to time synchronization that are sent by the second network device with the time information sent by the original grandmaster clock over a longer period, or receiving an authorization on a higher protocol level.

25. The non-transitory computer-readable medium as claimed in claim 10, wherein the declining comprises:

sending an Announce message to the second network device with clock parameters that represent a better clock than those transmitted in the Announce message of the second network device, maintaining the virtual base time domain for as long as further Announce messages arrive from the second network device and no authorization of the new grandmaster clock announced by the second network device takes place on a higher protocol level.

26. The non-transitory computer-readable medium as claimed in claim 10, additionally comprising, if the first checking reveals that the messages relating to time synchronization received from the second network device do not apply to the base time domain:

checking whether the messages relating to time synchronization apply to a previously started virtual base time domain and, if so:

verifying the clock parameters sent by the second network device, and performing the subsequent method steps, or, if not:

forwarding or ignoring the messages relating to time synchronization.

27. The non-transitory computer-readable medium as claimed in claim 10, additionally comprising, if the second checking reveals that the received Announce message does not announce a new grandmaster clock having better clock parameters than those of the present grandmaster clock:

ignoring the Announce message.

28. The non-transitory computer-readable medium as claimed in claim 10, wherein messages that arrive on the first network device from the second network device and are not used for clock synchronization but are provided with time information are forwarded by the first network device only after the first network device has added information to the message about the unclear trustworthiness of the time information, or after the first network device has informed all other network devices in the network about the unclear trustworthiness of the time information in messages coming from the second network device.

\* \* \* \* \*